United States Patent
Chen (10) Patent No.: US 12,242,419 B1
(45) Date of Patent: Mar. 4, 2025

(54) METHOD, SYSTEM AND APPARATUS FOR PROCESSING MASSIVE DATA AT HIGH SPEED, AND STORAGE MEDIUM

(71) Applicant: Hunan Tachyon Culture and Technology Co., Ltd., Hunan (CN)

(72) Inventor: Chao Chen, Changsha (CN)

(73) Assignee: Hunan Tachyon Culture and Technology Co., Ltd, Changsha (CN)

( * ) Notice: Subject to any disclaimer, the term of this patent is extended or adjusted under 35 U.S.C. 154(b) by 0 days.

(21) Appl. No.: 18/901,629

(22) Filed: Sep. 30, 2024

(30) Foreign Application Priority Data

Nov. 15, 2023 (CN) .......................... 202311517981.2

(51) Int. Cl.
| | | |
|---|---|---|
| G06F 16/00 | (2019.01) | |
| G06F 12/1009 | (2016.01) | |
| G06F 16/13 | (2019.01) | |
| G06F 12/1018 | (2016.01) | |

(Continued)

(52) U.S. Cl.
CPC ........ G06F 16/134 (2019.01); G06F 12/1009 (2013.01); *G06F 12/1018* (2013.01); *G06F 16/24558* (2019.01); *G06F 16/958* (2019.01)

(58) Field of Classification Search
CPC ............. G06F 16/134; G06F 16/24558; G06F 16/958; G06F 12/1009; G06F 12/1018
See application file for complete search history.

(56) References Cited

U.S. PATENT DOCUMENTS

| | | | |
|---|---|---|---|
| 2017/0371912 A1* | 12/2017 | Kimura ................. | G06F 3/0685 |
| 2019/0102476 A1 | 4/2019 | Liu et al. | |
| 2019/0324676 A1 | 10/2019 | Bensberg et al. | |

(Continued)

FOREIGN PATENT DOCUMENTS

| | | |
|---|---|---|
| CN | 103810237 A | 5/2014 |
| CN | 105550345 A | 5/2016 |

(Continued)

OTHER PUBLICATIONS

First Office Action, CN2023115179812, CNIPA, Dec. 22, 2023, 6 pages.

*Primary Examiner* — Diedra McQuitery
(74) *Attorney, Agent, or Firm* — Taft Stettinius & Hollister LLP; Stephen F. Rost (57) ABSTRACT

A method, a system and an apparatus are provided for processing massive data at a high speed, and a storage medium, which relate to the technical field of data processing. A data table where a target data type is stored is divided into a plurality of containers, where the containers store data and have pagination indexes, and each container is directly controlled to perform corresponding data processing according to the pagination index of each container in response to a data processing instruction. According to the solution, data processing can be directly performed by means of the data containers obtained by dividing, no third-party database server is required to be deployed, such that the solution is more advantageous in client application; and without reliance on service, performance consumption of communication with a service is reduced, and data processing efficiency is higher. The data table is divided into the plurality of containers, such that data processing can be performed by utilizing multi-threads, and data processing efficiency is improved.

7 Claims, 7 Drawing Sheets

(51) Int. Cl.
    *G06F 16/2455*    (2019.01)
    *G06F 16/958*    (2019.01)

(56)     References Cited

U.S. PATENT DOCUMENTS

2020/0142868  A1*   5/2020   Varadarajan .......... G06F 16/278
2021/0232557  A1    7/2021   Zhang et al.
2023/0014697  A1    1/2023   Freedman et al.
2023/0195710  A1    6/2023   Wang et al.
2024/0220460  A1*   7/2024   Chen ..................... G06F 16/148

FOREIGN PATENT DOCUMENTS

CN        105701145  A      6/2016
CN        108605010  A      9/2018
CN        113721862  A     11/2021
CN        114327857  A      4/2022
CN        115168338  A     10/2022
CN        116521181  A      8/2023

* cited by examiner

| Data table 1 header | Data table 1 Page 1 header | Data table 1 Page 1 actual data | Data table 1 Page 2 header | Data table 1 Page 2 actual data | ...... | Data table 2 header | Data table 2 Page 1 header | Data table 2 Page 1 actual data | ...... |

METHOD, SYSTEM AND APPARATUS FOR PROCESSING MASSIVE DATA AT HIGH SPEED, AND STORAGE MEDIUM

RELATED APPLICATIONS

This application claims priority to Chinese Patent Application Ser. No. CN2023115179812, filed Nov. 15, 2023, the disclosure of which is hereby incorporated by reference in its entirety.

TECHNICAL FIELD

The disclosure relates to the technical field of data processing, and particularly relates to a method, system and apparatus for processing massive data at a high speed, and a storage medium.

BACKGROUND

Computer programs are frequently required to process massive data. In the prior art, the data are processed by the programs with the aid of mature third-party database management systems, which is mature and versatile. But data processing requirements cannot be fully satisfied in a case of specific requirements. For example, a service-type memory database represented by a remote dictionary service (Redis) is faster in terms of data read and write efficiency, but since it exists in form of a service, communication is required for its interaction with a program. The communication efficiency will become a bottleneck of the read and write efficiency, and a large amount of memories will be consumed for processing massive data.

SUMMARY OF THE INVENTION

In view of this, the disclosure provides a method, a system and an apparatus for processing massive data at a high speed, and a storage medium, so as to solve the technical problem that a third-party database management system is configured to process data but cannot fully satisfy data processing requirements in a case of specific requirements.

In a first aspect, the disclosure provides a method for processing massive data at a high speed. The method includes: dividing a data table where a target data type is stored into a preset number of data pages, where the data pages are containers storing data and having pagination indexes; and controlling each container to perform corresponding data processing according to the pagination index of each container in response to a data processing instruction.

In the method for processing massive data at a high speed provided in the disclosure, a data table where a target data type is stored is divided into a plurality of containers, where the containers store data and has pagination indexes, each container is directly controlled to perform corresponding data processing according to the pagination index of each container in response to a data processing instruction. According to the solution, data processing can be directly performed by means of the data containers obtained by dividing, no third-party database server is required to be deployed, and the solution is more advantageous in client application; and without reliance on service, performance consumption of communication with a service is reduced, and data processing efficiency is higher.

In an optional embodiment, a hash value corresponding to target data is calculated in response to receiving a target data adding instruction; a remainder operation is performed on the preset number by the hash value, and a remainder value is obtained; and a container corresponding to a corresponding pagination index is controlled to add the target data to a current data page according to the remainder value.

According to the disclosure, when target data is newly added, the hash value of the target data is calculated, and the storing container is determined through the hash value, such that when the target data is searched for subsequently, the corresponding container may be directly located, so as to search for the target data conveniently, waste of resources is reduced, and efficiency of data processing is improved.

In an optional embodiment, a hash value corresponding to target data is calculated in response to receiving a target data deletion instruction; a remainder operation is performed on the preset number by the hash value, and a remainder value is obtained; and a container corresponding to a corresponding pagination index is controlled to delete the target data from a current data page according to the remainder value.

According to the disclosure, the hash value is calculated for the data processed in the container, and the corresponding container may be directly located by means of the hash value, such that the corresponding container deletes the data, searching for the data needed to be processed in all containers is avoided, and the efficiency of data processing is improved.

In an optional embodiment, all the containers are controlled to search for target data simultaneously according to the pagination index of each container in response to receiving a target data search instruction, where the target data search instruction includes a search condition of the target data; and the target data found by the containers are obtained when any found data satisfies the search condition of the target data or when all the containers end a target data search operation.

According to the disclosure, the data table where the target data type is stored is divided into a plurality of data pages, a multithread operation is used when the target data is searched, such that all the containers search for data simultaneously, and the efficiency of data search is improved.

In an optional embodiment, the method further includes: controlling the container to modify the target data found by the container into new data in response to receiving a target data modification instruction.

After the target data are found through multithread, the corresponding container may also be controlled to modify the target data found by the container into new data in response to receiving a target data modification instruction, such that a multi-aspect processing function for the data is implemented, and target data modification efficiency is improved.

In an optional embodiment, the method further includes: serializing the data in all the containers simultaneously in response to receiving a data storage instruction, and obtaining a binary array corresponding to each container, where the binary array includes data and a page header stored in the container, and the page header stores a data length corresponding to the container and the pagination index corresponding to the container; and merging binary arrays corresponding to all the containers, adding a table header, obtaining binary data corresponding to the data table where the target data type is stored, and storing the binary data in a local file, where the table header stores a data length corresponding to the binary data corresponding to the data table and a data type.

According to the disclosure, the binary data are obtained by serializing the data in all the containers and simultaneously by using multithread, the binary data corresponding to all the containers are merged, the table header is added, and the binary data corresponding to the data table where the target data type is stored is obtained and stored locally, such that a high-speed access and writing operation on the massive data can be implemented.

In an optional embodiment, the method further includes: reading the binary data of the data length corresponding to the data table from the local file according to the data type stored in the table header and the data length corresponding to the data table in response to receiving a data reading instruction; and reading, according to a pagination index stored in a page header of the binary data and a data length corresponding to a container of the binary data, binary data of the data length corresponding to the container, performing deserialization, and obtaining corresponding containers.

According to the disclosure, the binary data are read locally according to the data type stored in the table header and the data length corresponding to the data table, the binary data of the data length corresponding to the container are read according to the pagination index stored in the page header of the binary data and the data length corresponding to the container, deserialization is performed, and the corresponding containers are obtained, such that a high-speed reading operation on the massive data can be implemented, and functions of high-speed access and balancing reading and writing efficiency are implemented.

In a second aspect, the disclosure provides a system for processing massive data at a high speed. The system includes:

a controller, where the controller includes a memory and a processor, the memory and the processor are communicatively connected to each other, the memory stores a computer instruction, and the processor executes the computer instruction to execute the method for processing massive data at a high speed according to the first aspect or any one of embodiments corresponding to the first aspect.

A preset number of containers configured to store data and perform data processing.

In a third aspect, the disclosure provides an apparatus for processing massive data at a high speed. The apparatus includes: a data table dividing module configured to divide a data table where a target data type is stored into a preset number of data pages, where the data pages are containers storing data and having pagination indexes; and a data processing module configured to control each container to perform corresponding data processing according to the pagination index of each container in response to a data processing instruction.

In a fourth aspect, the disclosure provides a computer-readable storage medium. The computer-readable storage medium stores a computer instruction, where the computer instruction is configured to cause a computer to execute the method for processing massive data at a high speed according to the first aspect or any one of embodiments corresponding to the first aspect.

BRIEF DESCRIPTION OF THE DRAWINGS

In order to more clearly illustrate technical solutions in the embodiments of the disclosure or in the prior art, a brief introduction to the accompanying drawings required for the description of the embodiments or the prior art will be provided below. Apparently, the accompanying drawings in the following description are some of the embodiments of the disclosure, and those of ordinary skill in the art would also be able to derive other drawings from these drawings without making creative efforts.

DETAILED DESCRIPTION

In order to make the objectives, technical solutions, and advantages in examples of the disclosure clearer, the technical solutions in the examples of the disclosure are clearly and completely described below with reference to the accompanying drawings in the examples of the disclosure. Apparently, the examples described are some examples rather than all examples of the disclosure. Based on the examples the disclosure, all other examples derived by those skilled in the art without creative efforts fall within the scope of protection of the disclosure.

There is a common requirement for "high-speed read and write operations on massive data". Traditional practices generally include:

A memory database (where data is processed in memory), most commonly redis, of service-based databases is used. Since it is a memory database, it has desirable high-speed read and write efficiency, and is a currently known optimal solution for the above requirements. The database technology is widely used in game servers and other scenarios that need to read and write a large amount of data, but because the database technology exists in form of services, and interaction with a program needs to be implemented through communication, communication efficiency becomes a bottleneck of read and write efficiency. A serialization solution of redis is JavaScript object notation (json). When processing massive data, json serialization efficiency and memory footprint do not have desirable performance. In particular, with the drawback of a large memory footprint, a large amount of memories are consumed when massive data are processed.

A file-based database is used, such as sqlite (a relational database). Its advantages are lightweight and able to achieve direct connection, but the file-based database is not excellent in read and write efficiency, and only has the advantages of being lightweight and communication-free over the service-base database.

A read-only database is used. The read-only database has excellent read and query performance and fast deserialization, but write performance is poor, and only one aspect can be considered.

In the prior art, the data are processed by the programs with the aid of mature third-party database management systems, which is mature and versatile. But data processing requirements cannot be fully satisfied in a case of specific requirements.

A method example for processing massive data at a high speed is provided according to an example of the disclosure. It should be noted that steps shown in the flowcharts of the accompanying drawings may be executed in a computer system, such as a set of computer-executable instructions. Moreover, although logic orders are shown in the flowcharts, in some cases, the steps shown or described may be executed in an order different from those herein.

Figure 1:
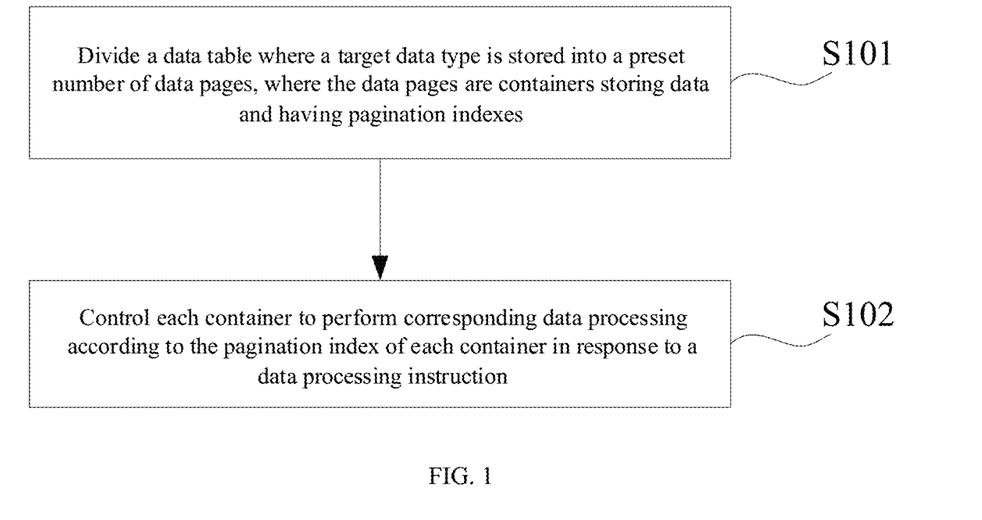
FIG. 1 is a schematic flowchart of a method for processing massive data at a high speed according to an example of the disclosure.

In the example, a method for processing massive data at a high speed is provided, and may be applied to the above system for processing massive data at a high speed. FIG. 1 is a flowchart of the method for processing massive data at a high speed according to the example of the disclosure. As shown in FIG. 1, the flowchart includes:

S101, a data table where a target data type is stored is divided into a preset number of data pages, where the data pages are containers storing data and having pagination indexes.

Figure 2:
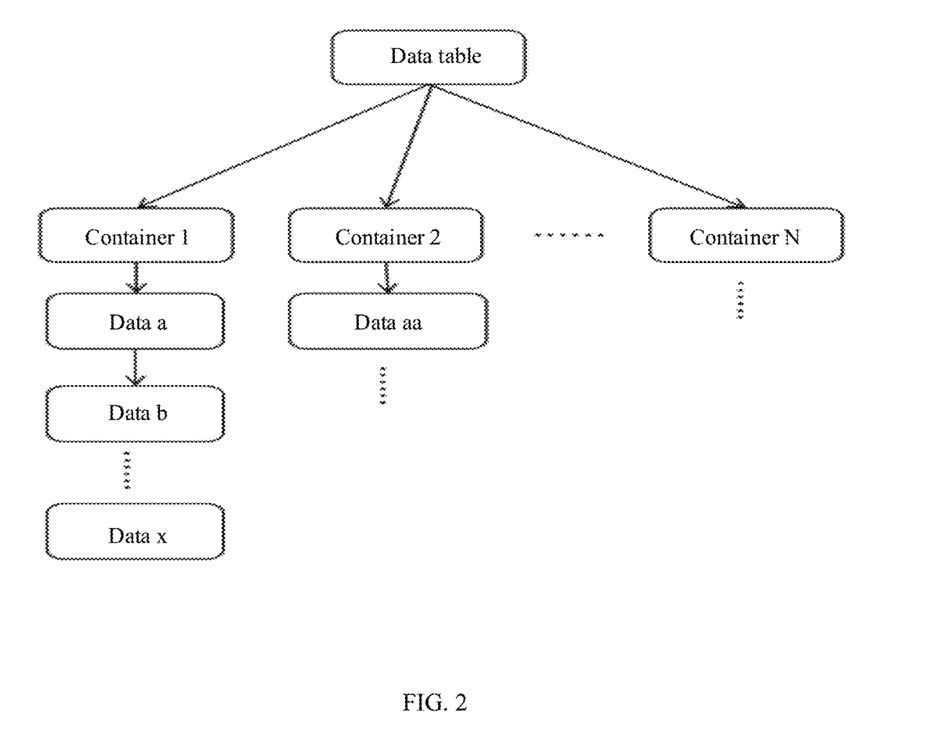
FIG. 2 is a schematic structural diagram of a data container according to an example of the disclosure.

In the example of the disclosure, data of the same data type are stored in the same data table. The data table where the target data type is stored may be divided into the preset number of data pages. The preset number may be set according to the amount of data in the data table. For example, if there are more data in the data table, a larger number of data pages may be set. The preset number may be represented by N. Each data page is a container that stores data and has a pagination index, and each container actually stores data. The container of the example of the disclosure may be a sequential container. As shown in FIG. 2, the data table with the target data type is divided into N containers, each container has a corresponding pagination index, and each container actually stores data, and the details of the stored data are repeated herein.

S102, each container is controlled to perform corresponding data processing according to the pagination index of each container in response to a data processing instruction.

In the example of the disclosure, the data processing instruction may be an instruction of data addition, data deletion, data search, data modification, etc. In the example of the disclosure, after the data deletion instruction is received, all the containers may be controlled to search for the target data, and the target data may be deleted after any container finds the target data in the data page. For example only, after the data adding instruction is received, in the example of the disclosure, the newly added data may be added to any container randomly, or any integer value may be selected as a hash value randomly. A remainder of the number of the containers may be taken by using the hash value to obtain a remainder value P greater than 0 and less than N. P may be used as a pagination index of the newly added data. The newly added data may be added to the container. Without limitation, for example only, after the data search instruction is received, the containers may be controlled to search for the target data in sequence according to the pagination indexes until the target data is found. For example only, a data modification instruction allows a container to modify the data directly after finding the target data.

In the method for processing massive data at a high speed provided in the example, a data table where a target data type is stored is divided into a plurality of containers, where the containers store data and are provided with pagination indexes, each container is directly controlled to perform corresponding data processing according to the pagination index of each container in response to a data processing instruction. According to the solution, data processing may be directly performed by means of the data containers obtained by dividing, no third-party database server is required to be deployed, and the solution is more advantageous in client application; and without reliance on service, performance consumption of communication with a service is reduced, and data processing efficiency is higher.

Figure 3:
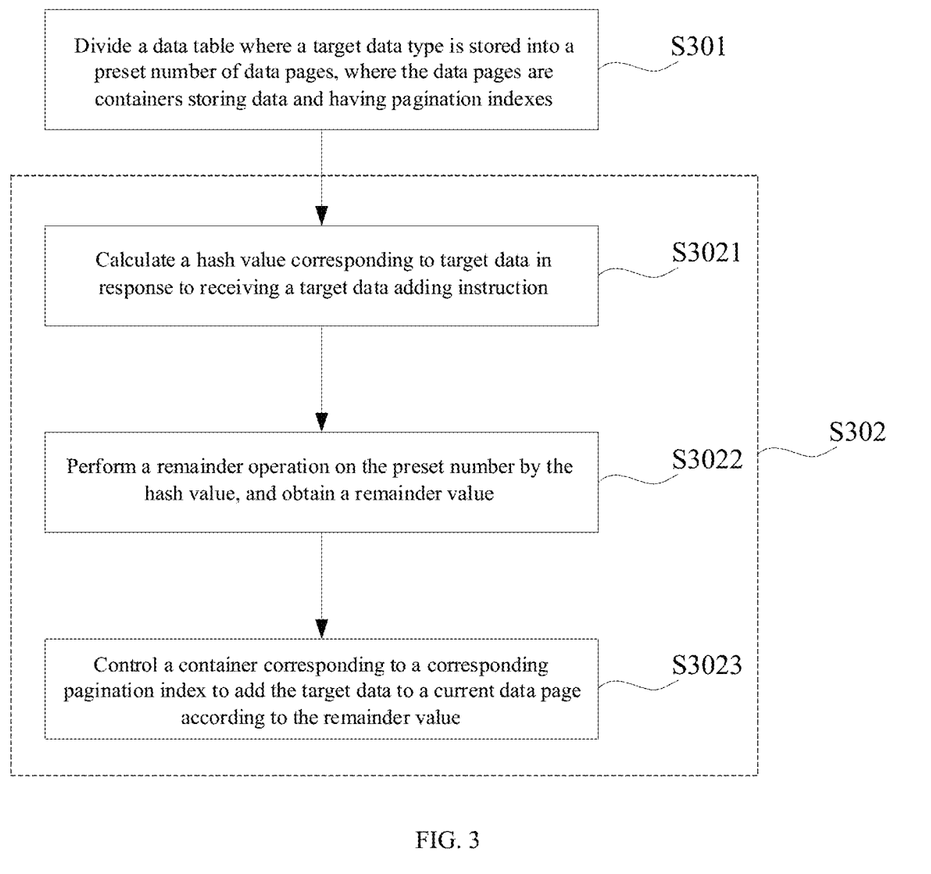
FIG. 3 is a schematic flowchart of another method for processing massive data at a high speed according to an example of the disclosure.

In the example, a method for processing massive data at a high speed is provided, and may be applied to the above system for processing massive data at a high speed. FIG. 3 is a flowchart of the method for processing massive data at a high speed according to the example of the disclosure. As shown in FIG. 3, the flowchart includes:

S301, a data table where a target data type is stored is divided into a preset number of data pages, where the data pages are containers storing data and having pagination indexes. Reference is made to S101 of the example as shown in FIG. 1 for detail, which will not be repeated herein.

S302, each container is controlled to perform corresponding data processing according to the pagination index of each container in response to a data processing instruction.

Specifically, S302 includes:

S3021, a hash value corresponding to target data is calculated in response to receiving a target data adding instruction.

In the example of the disclosure, when the target data adding instruction is received, the hash value corresponding to the target data first may be calculated. The hash value corresponding to the target data may be calculated through other values related to the data under the condition that the data are not obtained, or directly through the target data. With the support of the former, the disclosure has higher efficiency than the latter. A general hash algorithm may also be used for calculation. Without limitation, hash value calculation may be generated by any hash function, and alternatively, the hash value may be obtained by hash table lookup.

S3022, a remainder operation is performed on the preset number by the hash value, and a remainder value is obtained.

In the examples of the disclosure, after the hash value of the target data is obtained, the hash value may be used to perform a remainder operation on the preset number N to obtain the remainder value P greater than zero and less than N.

S3023, a container corresponding to a corresponding pagination index is controlled to add the target data to a current data page according to the remainder value.

Figure 4:
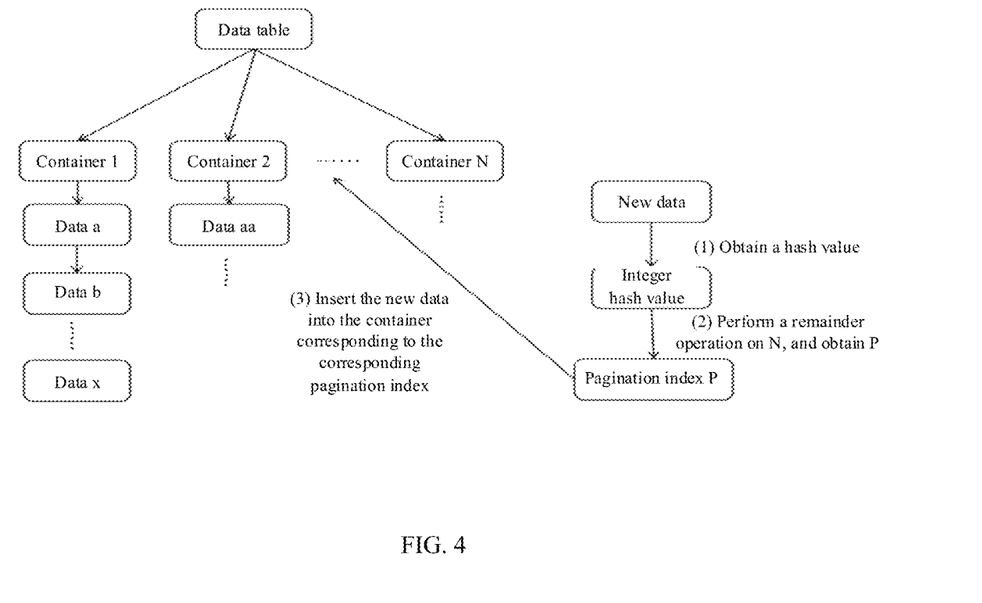
FIG. 4 is a schematic flowchart of adding new data according to an example of the disclosure.

In the example of the disclosure, as shown in FIG. 4, an integer hash value corresponding to the new data is obtained. The integer hash value is used to perform a remainder operation on the number N of the container to obtain the remainder value P. The remainder value P is used as a pagination index to be added to the new data, that is, the pagination index is also P. The new data is inserted into the container corresponding to the corresponding pagination index, which is only an instance.

In the example of the disclosure, after the remainder value P is obtained, P may be directly taken as the pagination index where the target data should be located, and then the container of the pagination index may be controlled to insert the target data into the data page. When the target data are searched subsequently, the hash value of the target data to be searched may also be calculated, and the corresponding pagination index may be directly located. The container of the pagination index is controlled to search for the target data, and the containers of other pagination indexes may not execute the search operation, such that the waste of resources is reduced.

According to the disclosure, when target data is newly added, the hash value of the target data is calculated, and the storing container is determined through the hash value, such that when the target data is searched for subsequently, the corresponding container may be directly located, so as to search for the target data conveniently, waste of resources is reduced, and efficiency of data processing is improved.

Step a1, a hash value corresponding to target data is calculated in response to receiving a target data deletion instruction; a remainder operation is performed on the preset number by the hash value, and a remainder value is obtained; and a container corresponding to a corresponding pagination index is controlled to delete the target data from a current data page according to the remainder value.

In the example of the disclosure, after the target data deletion instruction is received, the hash value of the target data D to be deleted may also be calculated. Alternatively, the hash value may be used to perform a remainder operation on the preset number N to obtain the remainder value P, and the remainder value P is used as the pagination index where the target data is located, such that the target data may be found and deleted by the container with the corresponding pagination index.

According to the disclosure, the hash value is calculated for the data processed in the container, and the corresponding container may be directly located by means of the hash value, such that the corresponding container deletes the data, searching for the data needed to be processed in all containers is avoided, and the efficiency of data processing is improved.

Figure 5:
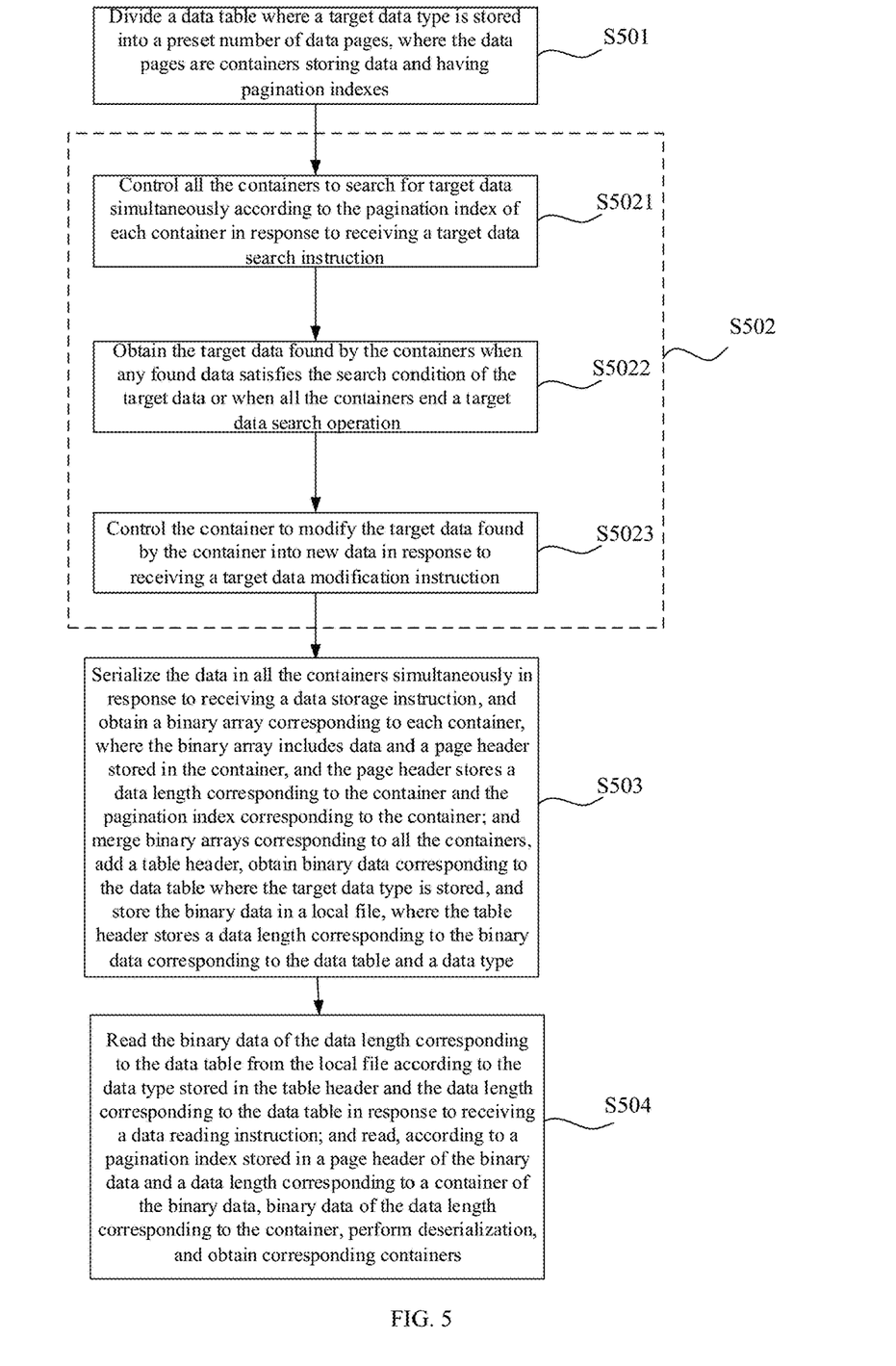
FIG. 5 is a schematic flowchart of yet another method for processing massive data at a high speed according to an example of the disclosure.

In the example, a method for processing massive data at a high speed is provided, and may be applied to the above system for processing massive data at a high speed. FIG. 5 is a flowchart of the method for processing massive data at a high speed according to the example of the disclosure. As shown in FIG. 5, the flowchart includes:

S501, a data table where a target data type is stored is divided into a preset number of data pages, where the data pages are containers storing data and having pagination indexes. Reference is made to S301 of the example as shown in FIG. 1 for detail, which will not be repeated herein.

S502, each container is controlled to perform corresponding data processing according to the pagination index of each container in response to a data processing instruction.

Specifically, S502 includes:

S5021, all the containers are controlled to search for target data simultaneously according to the pagination index of each container in response to receiving a target data search instruction.

The target data search instruction includes search conditions of the target data.

In the example of the disclosure, searching for data in a database typically requires a search condition, such as ID being 1, Age>18, etc. For example only, a delegate whose formal parameter is data and whose return value is bool needs to be input, and then the delegate may be used as a basis to control each container to start searching for the target data in multiplethread, that is, to control all the containers to search for the target data simultaneously.

S5022, the target data found by the containers are obtained when any found data satisfies the search condition of the target data or when all the containers end a target data search operation.

In the example of the disclosure, after a container finds the data satisfying the search condition of target data, all the containers may be controlled to terminate all threads ahead of time, and then the container may transmit the found data to a system. All containers may also be controlled to terminate the threads of target data search normally, and then all data satisfying the search condition may be obtained. Without limitation, after the data satisfying the search condition of target data is obtained, the data may be returned to a client interface of a computer operating system.

According to the disclosure, the data table where the target data type is stored is divided into a plurality of data pages, a multithread operation is used when the target data is searched, such that all the containers search for data simultaneously, and the efficiency of data search is improved.

S5023, the container is controlled to modify the target data found by the container into new data in response to receiving a target data modification instruction.

In the example of the disclosure, after the data satisfying the search condition of target data are obtained, the container may be controlled to replace the target data found by the container with new modification data directly in response to receiving the new modification data in the target data modification instruction. In a specific example, a data result returned by search is a reference, and modification on the reference is equivalent to modification on the data in the database, such that the returned reference can be directly modified.

After the target data are found through multithread, the corresponding container may also be controlled to modify the target data found by the container into new data in response to receiving a target data modification instruction, such that a multi-aspect processing function for the data is implemented, and target data modification efficiency is improved.

S503, the data in all the containers are serialized simultaneously in response to receiving a data storage instruction, and a binary array corresponding to each container is obtained, where the binary array includes data and a page header stored in the container, and the page header stores a data length corresponding to the container and the pagination index corresponding to the container; and binary arrays corresponding to all the containers are merged, a table header is added, binary data corresponding to the data table where the target data type is stored is obtained, and the binary data is stored in a local file, where the table header stores a data length corresponding to the binary data corresponding to the data table and a data type.

In the example of the disclosure, data storage, that is, data writing, is to serialize a memory structure and write a serialization result locally. A serialization solution is not limited, and may be to serialize the data to obtain octal data, etc. In order to satisfy requirements of high-speed read and write, the example of the disclosure uses a binary serialization solution to start a serialization operation on all the containers in multiplethread. Each container is serialized simultaneously by using the binary serialization solution to obtain binary data. The pagination index corresponding to each container and the data length of the obtained binary data may be taken as a page header, such that a binary array with the page header in front and actual binary data in the rear is obtained. As a result of single-page serialization, when all the containers obtain their binary arrays, the binary data corresponding to all the containers are merged into binary data of a full page. A merging method may be to arrange and merge the binary data according to a pagination index order of all the containers, or may be to randomly arrange the binary data according to times taken to generate the corresponding binary data, with the shortest time ranking first which is not limited. Then the data types corresponding to all the containers and the merged data length may be taken as the table header, and the binary data of the full page obtained by merging the table header and the binary data corresponding to all the containers may also be merged, with the table header first. The binary data corresponding to the entire data table may be obtained, and may be saved in a local file.

Figure 6:
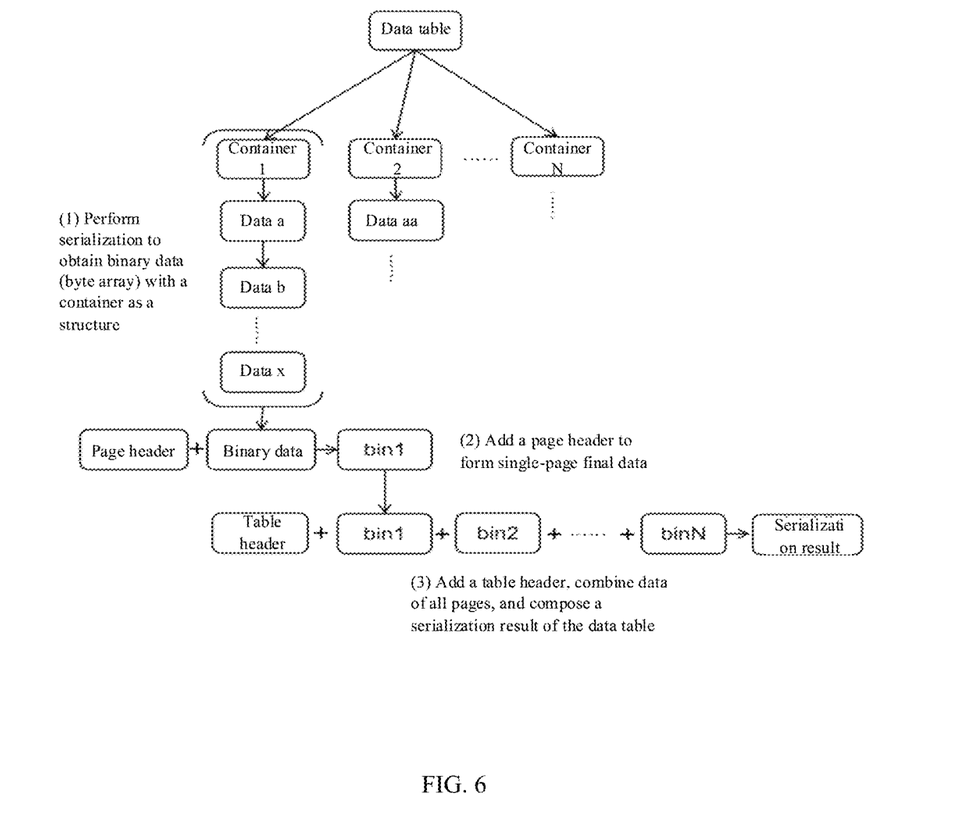
FIG. 6 is a schematic flowchart of storing data according to an example of the disclosure.
Figure 7:
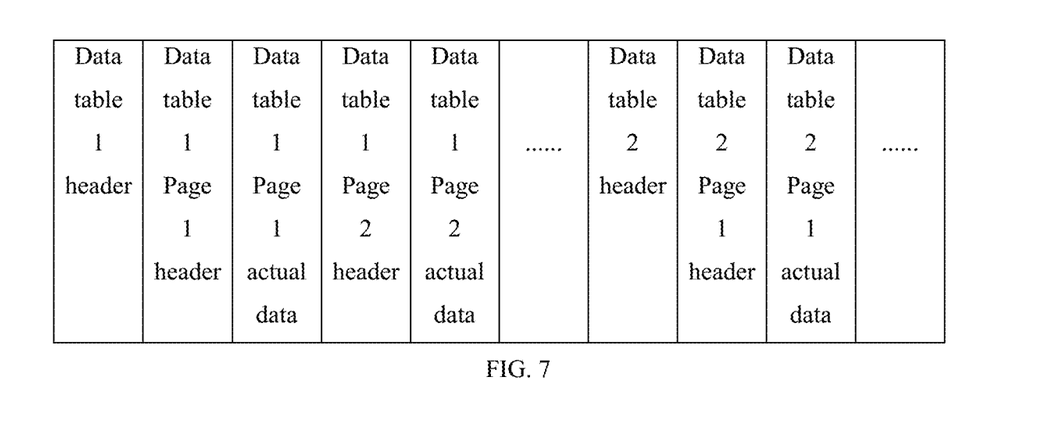
FIG. 7 is a schematic diagram of generating a serializing result of a data table according to an example of the disclosure.

In a specific example, as shown in FIG. 6, in the example of the disclosure, C# is taken as an example, binary serialization is performed on the data of each container by taking each container as a structural sequence, and a binary byte array is obtained. The pagination index of the container and the length of the obtained binary array serve as a page header and is converted into a byte array, and a serialization result bin1 corresponding to the container is obtained. The serialization result of each container is collected, the bin serialization results of all the containers are merged into a byte array of a full page, and bin1+bin2+ . . . binN is obtained. The data type corresponding to the data and a length of the byte array obtained by merging the serialization results of all the containers serve as a table header and are converted into byte data, and table header+bin1+bin2+ . . . binN is obtained. The entire serialization process is completed. The obtained header+bin1+bin2+ . . . binN is saved locally, so as to obtain binary data as shown in FIG. 7.

According to the disclosure, the binary data are obtained by serializing the data in all the containers and simultaneously by using multithread, the binary data corresponding to all the containers are merged, the table header is added, and the binary data corresponding to the data table where the target data type is stored is obtained and stored locally, such that a high-speed access and writing operation on the massive data can be implemented.

S504, the binary data of the data length corresponding to the data table are read from the local file according to the data type stored in the table header and the data length corresponding to the data table in response to receiving a data reading instruction; and according to a pagination index stored in a page header of the binary data and a data length corresponding to a container of the binary data, binary data of the data length corresponding to the container are read, deserialization is performed, and corresponding containers is obtained.

In the example of the disclosure, data reading is a reverse operation of writing, that is, a deserialization process. After the data reading instruction is received, the entire binary data may be read locally, and the data type converted from an integer length may be read from the table header. A length being the integer length converted into the length of the entire data table is read, and binary data of a data length corresponding to a data table may be extracted from the entire binary data. The following cyclic operations are performed on the binary data until the entire binary data are converted into containers: the integer length is read from the page header and converted into a pagination index, a data length being an integer length converted into the pagination index is read, binary data of the data length is read and deserialized to obtain a corresponding container. As shown in FIG. 7, 1: binary data of a fixed length are read as a table header; 2: a page header of a fixed length is read; 3: in this case, an actual data length of page 1 can be known according to the page header, and the binary data of the corresponding length can be read; 4: steps 2-3 are repeated until the read length reaches the length of entire table recorded in the table header; and 5: steps 1 to 4 are repeated to continue reading a table until the file is full read.

According to the disclosure, the binary data are read locally according to the data type stored in the table header and the data length corresponding to the data table, the binary data of the data length corresponding to the container are read according to the pagination index stored in the page header of the binary data and the data length corresponding to the container, deserialization is performed, and the corresponding containers are obtained, such that a high-speed reading operation on the massive data can be implemented, and functions of high-speed access and balancing reading and writing efficiency are implemented.

Figure 8:
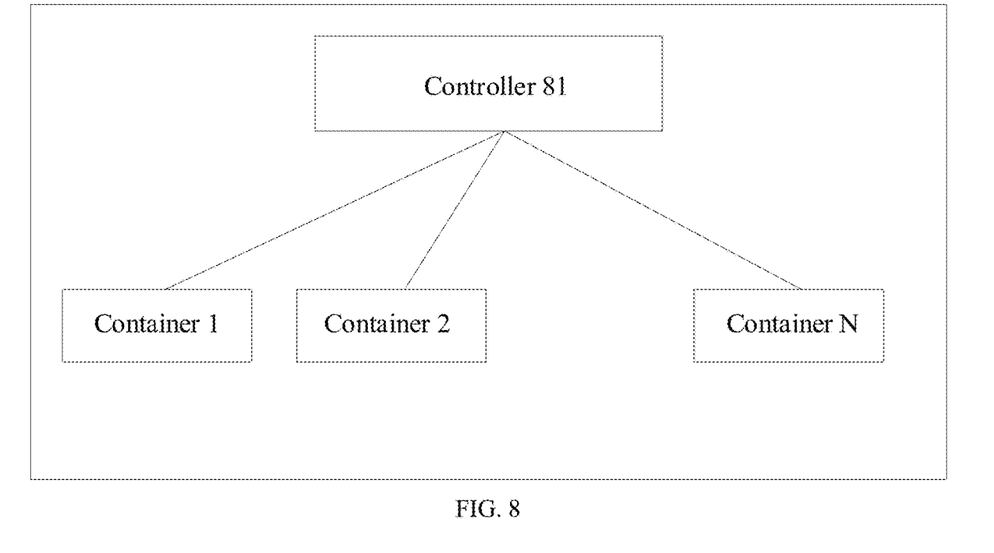
FIG. 8 is a structural block diagram of a system for processing massive data at a high speed according to an example of the disclosure.

The example further provides a system for processing massive data at a high speed. As shown in FIG. 8, the system for processing massive data at a high speed includes a preset number of containers, which may be container 1, container 2, . . . container N for storing data and processing data. Reference may be made to the above examples for a specific implementation process, which will not be repeated herein. The system further includes a controller 81. The controller 81 includes a memory and a processor. The memory and the processor are communicatively connected to each other. Computer instructions are stored on the memory. The processor executes the computer instructions to execute the method for processing massive data at a high speed in the above example. Reference may be made for details of the method for processing massive data at a high speed to the above examples, which will not be repeated herein.

The example further provides an apparatus for processing massive data at a high speed. The apparatus is configured for implementing the example described above and preferred embodiments, the repetitions of which will not be described in detail herein. As used below, the term "module" can be a combination of software and/or hardware that implements preset functions. While the apparatus described in the following example is preferably implemented through software, it is possible to conceive that the apparatus is implemented through hardware, or a combination of the software and the hardware.

Figure 9:
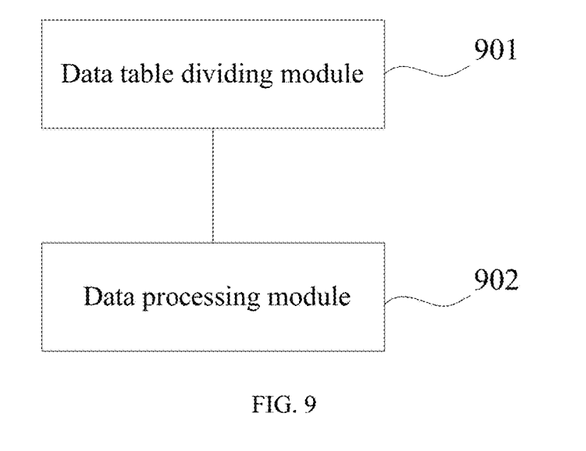
FIG. 9 is a structural block diagram of an apparatus for processing massive data at a high speed according to an example of the disclosure.

The example provides an apparatus for processing massive data at a high speed. As shown in FIG. 9, the apparatus includes:
  a data table dividing module 901 configured to divide a data table where a target data type is stored into a preset number of data pages, where the data pages are containers storing data and having pagination indexes; and
  a data processing module 902 configured to control each container to perform corresponding data processing according to the pagination index of each container in response to a data processing instruction.

In some optional embodiments, the data processing module 902 includes: a hash value calculation unit configured to calculate a hash value corresponding to target data in response to receiving a target data adding instruction; a remainder taking unit configured to perform a remainder operation on the preset number by the hash value, and obtain a remainder value; and a data adding unit configured to control a container corresponding to a corresponding pagination index to add the target data to a current data page according to the remainder value.

In some optional embodiments, the data processing module 902 includes: a hash value calculation unit configured to calculate a hash value corresponding to target data in response to receiving a target data deletion instruction; a remainder taking unit configured to perform a remainder operation on the preset number by the hash value, and obtain a remainder value; and a data deletion unit configured to control a container corresponding to a corresponding pagination index to delete the target data from a current data page according to the remainder value.

In some optional embodiments, the data processing module 902 includes: a data search unit configured to control all the containers to search for target data simultaneously according to the pagination index of each container in response to receiving a target data search instruction, where the target data search instruction includes a search condition of the target data; and a data obtaining unit configured to obtain the target data found by the containers when any found data satisfies the search condition of the target data or when all the containers end a target data search operation.

In some optional embodiments, the data processing module 902 further includes: a data modification unit configured to control the container to modify the target data found by the container into new data in response to receiving a target data modification instruction.

In some optional embodiments, the apparatus for processing massive data at a high speed further includes: a data serializing module configured to serialize the data in all the containers simultaneously in response to receiving a data storage instruction, and obtain a binary array corresponding to each container, where the binary array includes data and a page header stored in the container, and the page header stores a data length corresponding to the container and the pagination index corresponding to the container; and a data writing module configured to merge binary arrays corresponding to all the containers, add a table header, obtain binary data corresponding to the data table where the target data type is stored, and store the binary data in a local file, where the table header stores a data length corresponding to the binary data corresponding to the data table and a data type.

In some optional embodiments, the apparatus for processing massive data at a high speed further includes: a data reading module configured to read the binary data of the data length corresponding to the data table from the local file according to the data type stored in the table header and the data length corresponding to the data table in response to receiving a data reading instruction; and a data deserializing module configured to read, according to a pagination index stored in a page header of the binary data and a data length corresponding to a container of the binary data, binary data of the data length corresponding to the container, perform deserialization, and obtain corresponding containers.

Further functional descriptions of the above modules and units are the same as those of the above corresponding examples, which will not be repeated herein.

The apparatus for processing massive data at a high speed in the example is presented in form of a functional unit. The unit is an application specific integrated circuit (ASIC), a processor and a memory for executing one or more pieces of software or fixed programs, and/or a different device capable of providing the above functions.

An example of the disclosure further provides a controller. The controller has the apparatus for processing massive data at a high speed shown in FIG. 9.

Figure 10:
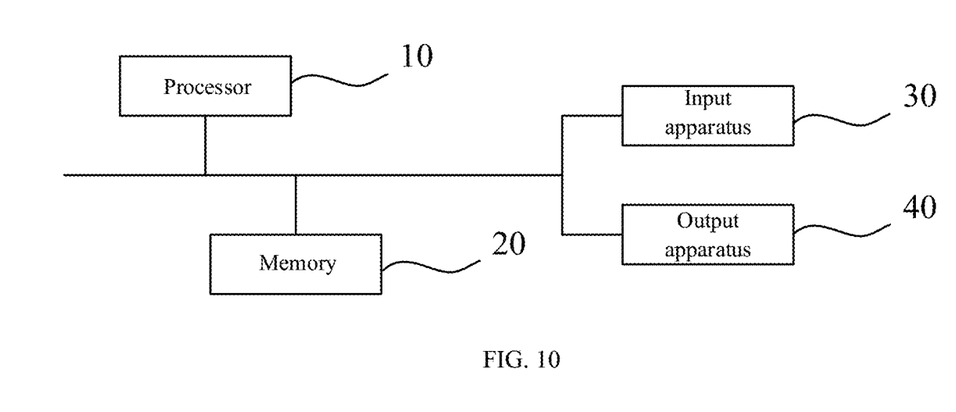
FIG. 10 is a structural schematic diagram of hardware of a controller according to an example of the disclosure.

With reference to FIG. 10, FIG. 10 is a schematic structural diagram of a controller according to an optional example of the disclosure. As shown in FIG. 10, the controller includes: one or more processors 10, a memory 20, and interfaces configured to be connected to all components and including a high-speed interface and a low-speed interface. All the components are communicatively connected to each other through different buses and may be mounted on a common motherboard or in other manners as required. The processor may process an instruction executed in the controller, including an instruction stored in or on the memory to display graphical information of a graphical user interface (GUI) on an external input/output apparatus (such as a display device coupled to the interface). In some optional embodiments, a plurality of processors and/or buses may be used along with a plurality of memories as required. Similarity, a plurality of controllers may be connected, and each device provides some necessary operations (for example, as a server array, a blade server set, or a multiprocessor system). One processor 10 is illustrated in FIG. 10.

The processor 10 may be a central processing unit, a network processing unit, or their combination. The processor 10 may further include a hardware chip. The hardware chip may be an application specific integrated circuit, a programmable logic device, or their combinations. The programmable logic device may be a complex programmable logic device, a field programmable logic gate array, a universal array logic, or their any combinations.

The memory 20 stores an instruction executable by at least one processor 10 to cause the at least one processor 10 to execute the method provided by the example.

The memory 20 may include a program storage area and a data storage area. The program storage area may store an operation system and an application program required by at least one function. The data storage area may store data created from the use of the controller, etc. Moreover, the memory 20 may include a high-speed random access memory, and a non-transitory memory, such as at least one magnetic disk storage device, a flash memory device, or other non-transitory solid-state storage devices. In some optional embodiments, the memory 20 may optionally include a memory remotely arranged with respect to the processor 10, and the remote memory may be connected to the controller by means of a network. The instances of the network include, but are not limited to, the Internet, an intranet, a local area network, a mobile communication network, and their combinations.

The memory 20 may include a volatile memory, such as random access memory. The memory may also include a nonvolatile memory, such as a flash memory, a hard disk or a solid state disk. The memory 20 may also includes combinations of the above types of memories.

The controller further includes an input apparatus 30 and an output apparatus 40. The processor 10, the memory 20, the input apparatus 30, and the output apparatus 40 may be connected through a bus, etc. In FIG. 10, they are connected through a bus, for example.

The input apparatus 30 may receive input digital or character information and generate a key signal input relevant to user settings and function control of the controller. The input apparatus may be a touch screen, a keypad, a mouse, a track pad, a touch pad, a pointing stick, one or more mouse buttons, a track ball, a joystick, etc. The output apparatus 40 may include a display device, an auxiliary lighting device (for example, a light emitting diode (LED)), a tactile feedback apparatus (for example, a vibration electric motor), etc. The display device includes, but is not limited to, a liquid crystal display, a light-emitting diode, a display, and a plasma display. In some optional embodiments, the display device may be a touch screen.

An example of the disclosure further provides a computer-readable storage medium. The method according to the examples of the disclosure may be implemented in hardware, firmware, or implemented to be recordable in a storage medium, or implemented to be a computer code originally stored in a remote storage medium or a non-transitory machine-readable medium downloaded over a network and stored in a local storage medium, such that the method described herein can be processed by such software stored in the storage medium using a general purpose computer, a special purpose processor, or programmable or dedicated hardware. The storage medium may be a magnetic disk, an optical disk, a read-only memory, a random access memory, a flash memory, a hard disk or a solid state disk, etc. Further, the storage medium may further include a combination of the above types of memories. It can be understood that a computer, a processor, a microprocessor controller, or programmable hardware includes a storage assembly that may store or receive software or a computer code. When accessed and executed by a computer, a processor, or hardware, the software or the computer code implements the method according to the above examples.

Although the examples of the disclosure have been described in conjunction with the accompanying drawings, various modifications and variations may be made by those skilled in the art without departing from the spirit and scope of the disclosure, and such modifications and variations fall within the scope defined by the appended claims.

The invention claimed is:

1. A method for processing massive data at a high speed, comprising:
   dividing a data table where a target data type is stored into a preset number of data pages, wherein the data pages are containers storing data and having pagination indexes; and
   controlling each container to perform corresponding data processing according to the pagination index of each container in response to a data processing instruction; wherein
   the method further comprising: serializing the data in all the containers simultaneously in response to receiving a data storage instruction, and obtaining a binary array corresponding to each container, wherein the binary array comprises data and a page header stored in the container, and the page header stores a data length corresponding to the container and the pagination index corresponding to the container; and merging binary arrays corresponding to all the containers, adding a table header, obtaining binary data corresponding to the data table where the target data type is stored, and storing the binary data in a local file, wherein the table header stores a data length corresponding to the binary data corresponding to the data table and a data type; and
   the method further comprising: reading the binary data of the data length corresponding to the data table from the local file according to the data type stored in the table header and the data length corresponding to the data table in response to receiving a data reading instruction; reading, according to a pagination index stored in a page header of the binary data and a data length corresponding to a container of the binary data, binary data of the data length corresponding to the container, performing deserialization, and obtaining corresponding containers; and
   returning to a step of reading the binary data of the data length corresponding to the data table from the local file according to the data type stored in the table header and the data length corresponding to the data table until binary data corresponding to all data tables in the local file are converted into containers.

2. The method for processing massive data at a high speed according to claim 1, wherein the controlling each container to perform corresponding data processing according to the pagination index of each container in response to a data processing instruction comprises:
   calculating a hash value corresponding to target data in response to receiving a target data adding instruction;
   performing a remainder operation on the preset number by the hash value, and obtaining a remainder value; and
   controlling a container corresponding to a corresponding pagination index to add the target data to a current data page according to the remainder value.

3. The method for processing massive data at a high speed according to claim 1, wherein the controlling each container to perform corresponding data processing according to the pagination index of each container in response to a data processing instruction comprises:
   calculating a hash value corresponding to target data in response to receiving a target data deletion instruction;
   taking performing a remainder operation on the preset number by the hash value, and obtaining a remainder value; and
   controlling a container corresponding to a corresponding pagination index to delete the target data from a current data page according to the remainder value.

4. The method for processing massive data at a high speed according to claim 1, wherein the controlling each container to perform corresponding data processing according to the pagination index of each container in response to a data processing instruction comprises:
   controlling all the containers to search for target data simultaneously according to the pagination index of each container in response to receiving a target data search instruction, wherein the target data search instruction comprises a search condition of the target data; and
   obtaining the target data found by the containers when any found data satisfies the search condition of the target data or when all the containers end a target data search operation.

5. The method for processing massive data at a high speed according to claim 4, further comprising:
   controlling the container to modify the target data found by the container into new data in response to receiving a target data modification instruction.

6. A system for processing massive data at a high speed, comprising:
   a controller, wherein the controller comprises a memory and a processor, the memory and the processor are communicatively connected to each other, the memory stores a computer instruction, and the processor executes the computer instruction to execute the method for processing massive data at a high speed according to claim 1; and
   a preset number of containers configured to store data and perform data processing.

7. A non-transitory computer-readable storage medium, storing a computer instruction, wherein the computer instruction is configured to cause a computer to execute the method for processing massive data at a high speed according to claim 1.

* * * * *